Dec. 29, 1953 V. S. CRANE ET AL 2,664,203
LIQUID FILTER DEVICE
Filed March 9, 1950 2 Sheets-Sheet 1

INVENTORS.
VICTOR S. CRANE.
PAUL R. HONAN.
BY
Lockwood, Goldsmith & Galt,
ATTORNEYS.

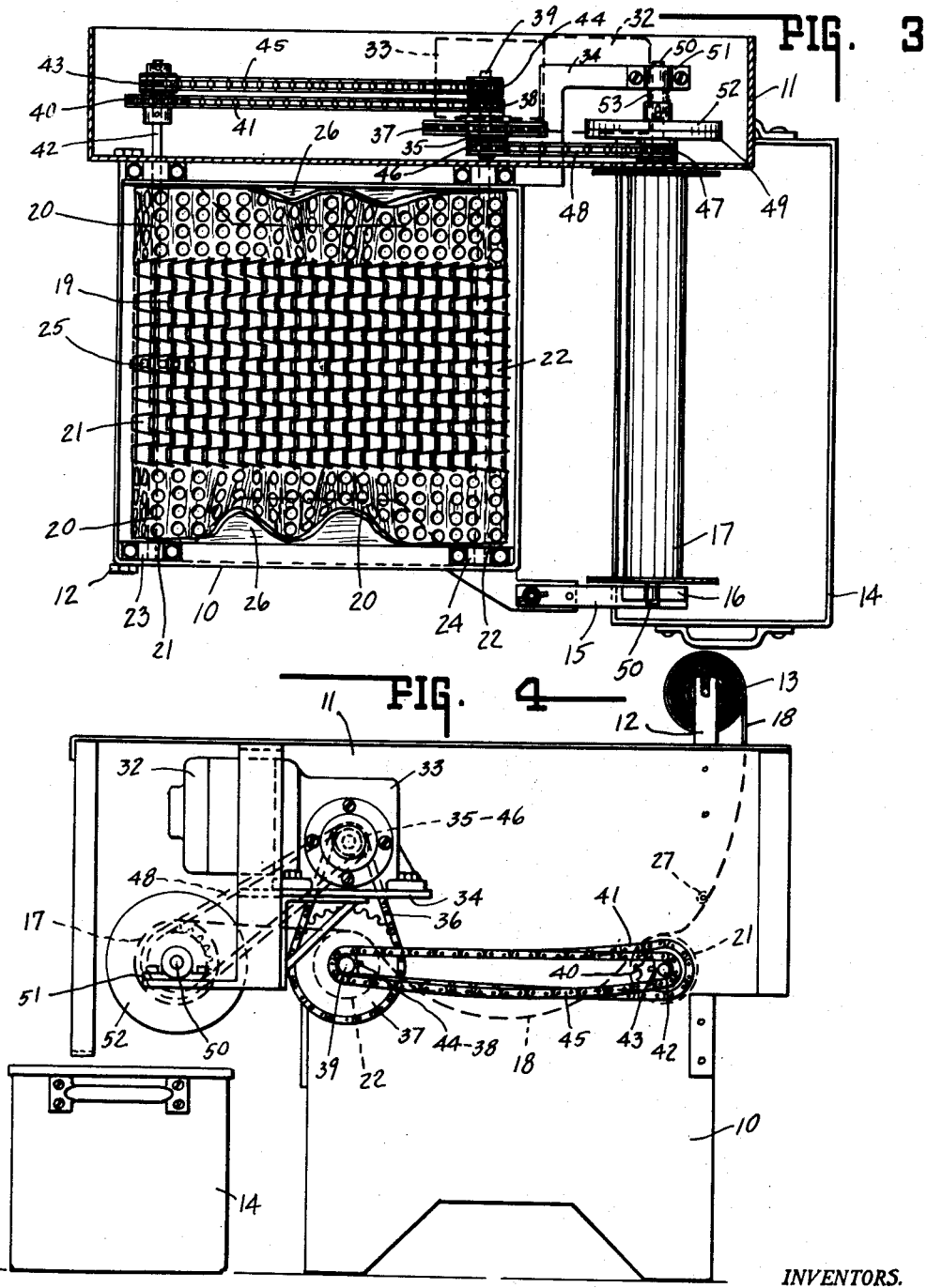

Patented Dec. 29, 1953

2,664,203

UNITED STATES PATENT OFFICE 2,664,203

LIQUID FILTER DEVICE

Victor S. Crane and Paul R. Honan, Lebanon, Ind., assignors to Delpark Corporation, Lebanon, Ind., a corporation Application March 9, 1950, Serial No. 148,711

7 Claims. (Cl. 210—196)

This invention relates to a liquid filter device for filtering liquids containing solids in suspension such as the filtering of fruit and vegetable juices as for example, filtering and reclaiming cooling and cutting lubricants, parts washing solvents, abrasive and detergent materials in liquid form. Many other uses may be made of the device wherein it is desired to filter a continuous flow of liquid.

For example, in operation of metal cutting machines it is necessary to constantly flow a cooling and cutting lubricant over the tool and work for the multiple purpose of dissipating heat, lubricating the surfaces and carrying away the cuttings. It is also customary to continuously return the lubricant from a sump for re-use until it becomes so saturated with the cutting dust as to lose its effectiveness. It thereupon becomes necessary to replace the lubricant and clean the sludge from the sump entailing a loss of material, as well as time and labor in cleaning out the sludge.

It is the object of this invention to provide a continuous filtering device as well as a solids or sludge disposing unit such that a liquid containing solids in suspension may be separated therefrom for producing a substantially solid free liquid for any use, a liquid free solid or both. The invention further provides for such continuous filtering wherein it is desired to re-use the filtered liquid to prevent waste. This is accomplished by flowing the liquid in any suitable manner onto a sheet of filter media supported above a suitable receptacle by a perforate supporting conveyor through which the liquid may readily pass after filtering through the said media, and periodically and progressively moving the filter sheet to present a fresh portion thereof as the solids or sludge build up thereon during the filtering process; the filter sheet carrying the solids to a receptacle for discharge therein wherein reclamation thereof is desired.

Thus, the device may serve a threefold purpose in the continuous filtering of solids carrying liquid involving the separation of the liquid from the solids wherein the filtered liquid may be used or re-used, solids may be reclaimed from the liquid, or both the solids and the liquid reclaimed for any desired use or re-use.

Various features and application of the invention will become apparent as hereinafter pointed out in the following specifications and claims, having reference to the accompanying drawings.

The full nature of the invention will be understood from the accompanying drawings and the following description and claims:

Fig. 3 is a plan view of the filter with the filtering sheet removed therefrom, with parts broken away, and the gear box in horizontal section.

Fig. 4 is a side elevation with the side wall of the gear box removed.

Figure 1:
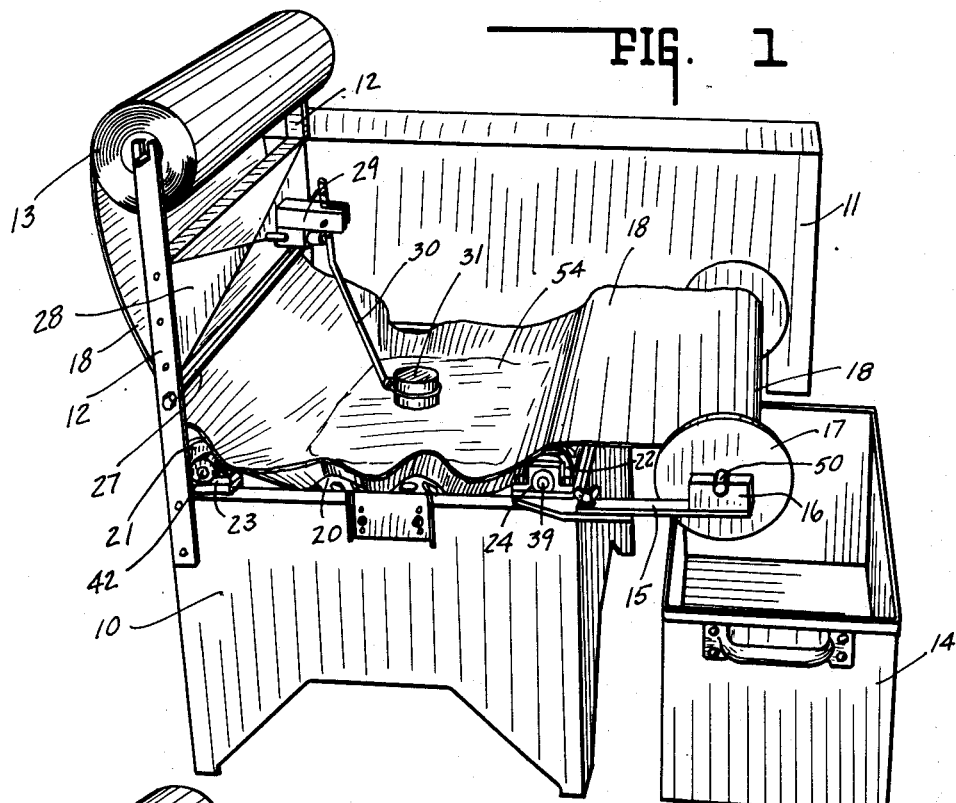
Fig. 1 is a perspective view of the filter showing it in operation.

In the drawings there is shown, as an example one application of the invention, a filtering device for receiving a continuous flow of the liquid to be filtered. The device includes a tank or sump 10, which may comprise any receptacle for containing or circulating the filtered liquid, having a gear box 11 mounted to one side thereof. Extending upwardly from one end of the tank 10 and secured thereon, there is a pair of standards 12 mounting at the upper end thereof a roll of filter media 13 preferably in sheet form. At the opposite end of the tank there is a removable receptacle 14 for receiving unfiltered sludge or solids discharged from the filter sheet. Extending forwardly from the adjacent end of the tank 10 to a position over the receptacle 14 there is a pair of supporting arms 15 overhanging the receptacle 14 and terminating in the bearing blocks 16. Mounted in the bearing blocks there is a reel 17 for reeling up the used filter sheet indicated at 18.

Figure 2:
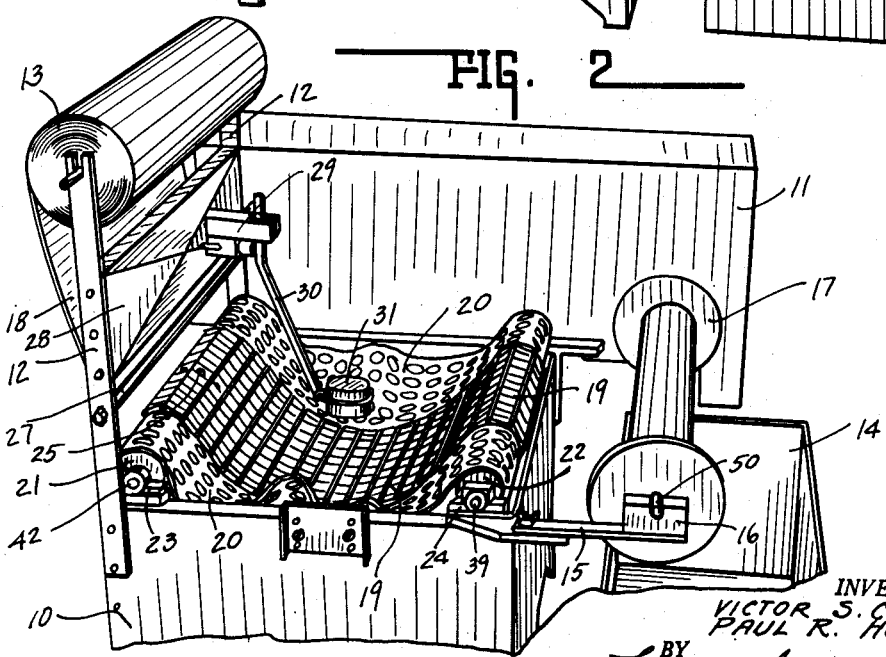
Fig. 2 is the same as Fig. 1 showing the filter with the filtering sheet removed.

Overlying the tank 10 there is provided a perforate filter sheet supporting conveyor such as an endless chain belt 19 having flexible perforate side skirts 20 having a series of apertures provided therein. The conveyor 19 is carried by the spaced rolls 21 and 22 rotatably mounted in the bearing blocks 23, 24 respectively, supported by the side walls of the tank 10 adjacent the opposite ends thereof. Said rolls are provided with a series teeth 25 for driving engagement with the link formation of the conveyor 19 for periodically driving said conveyor in the manner hereinafter described. The length of the conveyor relative to the spacing of the rolls 21 and 22 is such that it sags down between them as best illustrated in Fig. 2. On each side wall of the tank 10 extending inwardly therefrom adjacent the upper edge thereof there is provided a lifting cam 26 over which the side skirts 20 are caused to ride for elevation thereof to thereby form a depressed pocket as shown in Fig. 1, for receiving and containing the liquid discharged therein. The filter sheet 18 carried by the roll 13 is drawn downwardly about a guide rod 27 and over the conveyor and side skirts to be wound about reel 17, the roll 13 being loosely mounted so that the filter sheet will be permitted to sag down within the pocket provided by said belt.

Carried by the standards 12 there is a supporting plate 28 on which is mounted a control switch box 29 from which a switch lever 30 extends into said pocket carrying at its lower free end a float 31. Mounted in the gear box 11 there is a driving motor 32 in association with a speed reduction housing 33 mounted on a supporting bracket 34. The motor 32 drives a sprocket wheel 35 through the speed reduction gears in the housing 33. The sprocket 35 drives a chain 36 which in turn drives a sprocket wheel 37 to which is pinned a sprocket 38. Both the sprockets 37 and 38 rotate freely on a shaft 39 carrying the toothed roll 22. Sprocket 38 drives a sprocket wheel 40 through a chain 41. The sprocket 40 is keyed to a shaft 42 carrying the toothed roll 21. Also secured on the shaft 42 is a driving sprocket 43 which drives a sprocket 44 through a chain 45. The sprocket 44 is keyed to said shaft 39 for driving said toothed roll 22. Also carried on the reduction gear shaft and driven thereby together with the sprocket wheel 35 there is a second sprocket wheel 46 which drives a sprocket wheel 47 through a chain 48. The sprocket wheel 47 is secured to a clutch member 49, both being freely mounted for rotation upon a shaft 50 carrying and secured to the reel 17. The adjacent end of said shaft has its bearing in a bearing block 51. Keyed to the shaft 50 there is a clutch member 52 retained in clutching engagement with the clutch member 49 through a spring 53.

The above described drive is placed in operation when the motor 32 is energized upon elevation of the float 31 which closes the circuit through the motor by the control switch 29. Thereupon the motor through suitable reduction gearing, sprockets 35, 37, 38 and 40 drives the toothed roll 21 for slowly moving the endless conveyor 19 forwardly, or to the right of Figs. 1 and 2. The roll 22 carrying said conveyor is driven at the same speed through the connecting sprocket chain 45, sprockets 43 and 44 so that the endless conveyor while driven forwardly, at all times maintains its sag. The reel 17 is simultaneously driven at substantially the same speed as the conveyor for causing the filter sheet to move therewith. However, because of the gradually increasing diameter of the rolled up filter sheet on the reel, it is driven through the clutch so as to permit some slippage in its drive to compensate for such variation in diameter. Thus, the filter sheet will be permitted to move with the sagging conveyor support therefor rather than be stretched thereover.

In operation, the arrangement is such that the liquid, or coolant as from a cutting machine, will be directed into the pocket provided by the sagging conveyor and filter sheet to form a puddle, as indicated at 54 in Fig. 1. The conveyor and filter sheet will be at rest to permit the liquid to seep through the filter sheet into the tank 10 from which the filtered liquid will be pumped back to the machine in which it is used or otherwise disposed of. So long as the liquid filters through the filter sheet, the float 31 remains in its lowered position so that the circuit to the driving motor will remain open and the filter at rest. As the solids or sludge filtered from the liquid builds up in the pocket of the filter sheet to the extent of sealing it and preventing the liquid to filter therethrough, the level thereof will rise, causing the float to rise with it. When there is sufficient depth of unfiltered liquid standing in the pocket the float will close the circuit to the motor, causing the rolls 21, 22 and reel 17 to be driven until a fresh area of the filter sheet is drawn into the pocket through which the liquid rapidly seeps, permitting lowering of the float and discontinuance of the drive. Thus, a fresh section of the filter sheet will be presented for the continuing filter action. The solids or sludge, which have accumulated, will adhere to and be carried by the filter sheet as it progresses over the reel 17 at which time it will have been sufficiently dried in cake formation to freely drop from the sheet into the receptacle 14, the used filter sheet being free of the caked solids or sludge will thereupon be wound on the reel for ultimate discard.

From the foregoing it will be observed by way of one example, that through the medium of such filtering device fresh clean cooling and cutting lubricant or liquid will continuously flow through the cutting machine in which it is used so as to maintain its efficiency. Since it is continuously filtered it may be re-used indefinitely, effecting a substantial saving in the cost of replacement. On the other hand, the solids or sludge, comprising cuttings and metal dust, will be conveniently separated from the lubricant in a substantially dry state and collected in the receptacle 14. This eliminates the usual requirement of periodically cleaning out the sump and permits ready packaging of this waste material for use in the manufacture of abrasives and the like for which it has substantial value.

As above pointed out, various applications of the device may be made wherein it is desired to separate the solids from fruit or vegetable juices through a continuous operation; purify other liquids for various uses and reclaim liquids for re-use, or the solids therefrom such as liquid polishing or cleaning material involving abrasives or detergents, lubricating and cooling liquids.

The invention claimed is:

1. A liquid filter including a tank for receiving filtered liquid, a roll of expendable filter media mounted at one side of said tank, a winding reel for said media mounted at the opposite side thereof, an endless perforated conveyor supporting said media, driving rolls at each end of said tank for mounting and driving said conveyor, a lifting element on said tank over which opposite sides of said conveyor ride for causing it to sag therein to form a pocket, mechanism for periodically rotating said rolls at the same speed of rotation to move said conveyor and maintain the sag therein, a slip clutch operably connecting said mechanism and reel for normally driving said reel at the same speed of rotation as said rolls while permitting slippage thereof to compensate for increase in diameter of the rolled media for jointly moving said media and conveyor to present a fresh section thereof over said tank, and a control member in said pocket connected with said mechanism for periodically rendering said driving mechanism operative depending upon the accumulation of unfiltered liquid in said pocket.

2. A liquid filter including a tank for receiving filtered liquid, a roll of expendable filter media mounted at one side of said tank, a winding reel for said media mounted at the opposite side thereof, an endless perforated conveyor supporting said media, driving rolls at each end of said tank for mounting and driving said conveyor, a lifting element on said tank over which opposite sides of said conveyor ride for causing it to sag therein to form a pocket, mechanism for periodically rotating said rolls at the same speed of rotation to move said conveyor and maintain the sag therein, a slip clutch operably connecting said mechanism and reel for normally driving said reel at the same speed of rotation as said rolls while permitting slippage thereof to compensate for increase in diameter of the rolled media for jointly moving said media and conveyor to present a fresh section thereof over said tank, and a float supported in said pocket adjacent the filter paper operably connected with said driving mechanism for rendering it effective to drive said rolls and reel upon unfiltered liquid from said pocket reaching a predetermined level.

3. A liquid filter including a tank for receiving filtered liquid, a roll of expendable filter media mounted at one side of said tank, an endless perforated conveyor supporting said media, driving rolls at each end of said tank for mounting and driving said conveyor, a lifting element associated with each side of said tank for lifting the edges of said conveyor to provide a sag therein to form a pocket, mechanism for periodically rotating said rolls at the same speed of rotation to move said conveyor and maintain the sag therein to present a fresh section of filter media over said tank, and a float extending into said pocket adjacent the filter media operably connected with said driving mechanism for rendering it effective to drive said rolls upon unfiltered liquid in said pocket reaching a predetermined level.

4. A liquid filter including a tank for receiving filtered liquid, an expendable filter sheet issuing from a supply thereof mounted at the receiving end of said tank and extending thereover, a perforated conveyor supporting said filter sheet over said tank, a lifting element associated with said tank over which opposite sides of said conveyor ride for causing it to sag within said tank to form a liquid receiving pocket, driving rolls for said conveyor at each end of said tank, and mechanism rendered operative in accordance with the level of unfiltered liquid within said pocket to periodically drive one of said rolls to effect movement of said conveyor and filter sheet to move a fresh section thereof into filtering position within said pocket.

5. A liquid filter including a tank for receiving filtered liquid, an expendable filter sheet issuing from a supply thereof mounted at the receiving end of said tank and extending thereover, a perforated conveyor supporting said filter sheet, means at each side of said tank to cause the edges of said conveyor to be raised to form an intermediate liquid receiving pocket, driving mechanism for said conveyor for moving it with said filter sheet to present a fresh section thereof into pocket filtering position, and a float operably connected with said mechanism extending into said pocket to actuate said mechanism upon a predetermined rise of unfiltered liquid in said pocket.

6. A liquid filter including a tank for receiving filtered liquid, a roll of expendable filter media mounted at one end of said tank, a perforated movable support supporting said filter media, driving mechanism for periodically moving said support and filter media over said tank, a lifting element at each side of said movable support for raising the side edges thereof to form a pocket over said tank, and a control member positioned in said pocket governed by the accumulated supply of unfiltered liquid therein to actuate said driving mechanism to move a fresh section of said media into said pocket.

7. A liquid filter including a tank for receiving filtered liquid, an expendable filter media issuing from a supply thereof mounted at the receiving end of said tank to extend thereover, a movable perforated support supporting said filter media, a lifting member at opposite sides of said tank for elevating the side edges of said movable support to form a pocket, driving mechanism connected with said movable support for periodically moving it and said filter media over said tank, a float positioned adjacent the lower portion of said pocket to be raised by an accumulated supply of unfiltered liquid therein, and a float lever actuated by said float for rendering said driving mechanism effective to jointly move said media and support to present a fresh section thereof over said tank.

VICTOR S. CRANE.
PAUL R. HONAN.

References Cited in the file of this patent

UNITED STATES PATENTS

| Number | Name | Date |
| --- | --- | --- |
| 445,371 | Jewell | Jan. 27, 1891 |
| 794,631 | Milne | July 11, 1905 |
| 1,837,368 | Medin | Dec. 22, 1931 |
| 2,097,529 | Nordell | Nov. 2, 1937 |